United States Patent Office 3,061,943
Patented Nov. 6, 1962

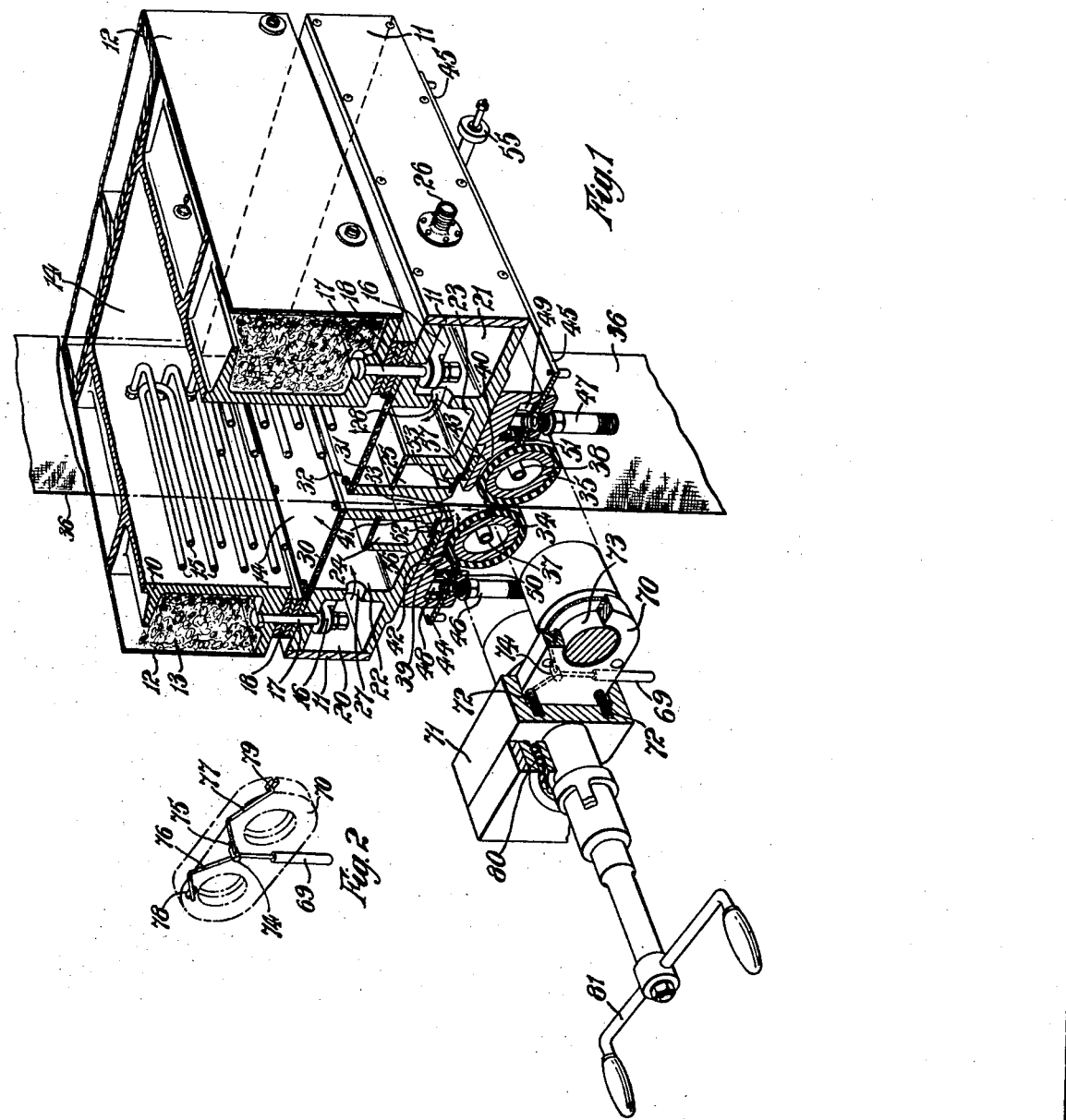

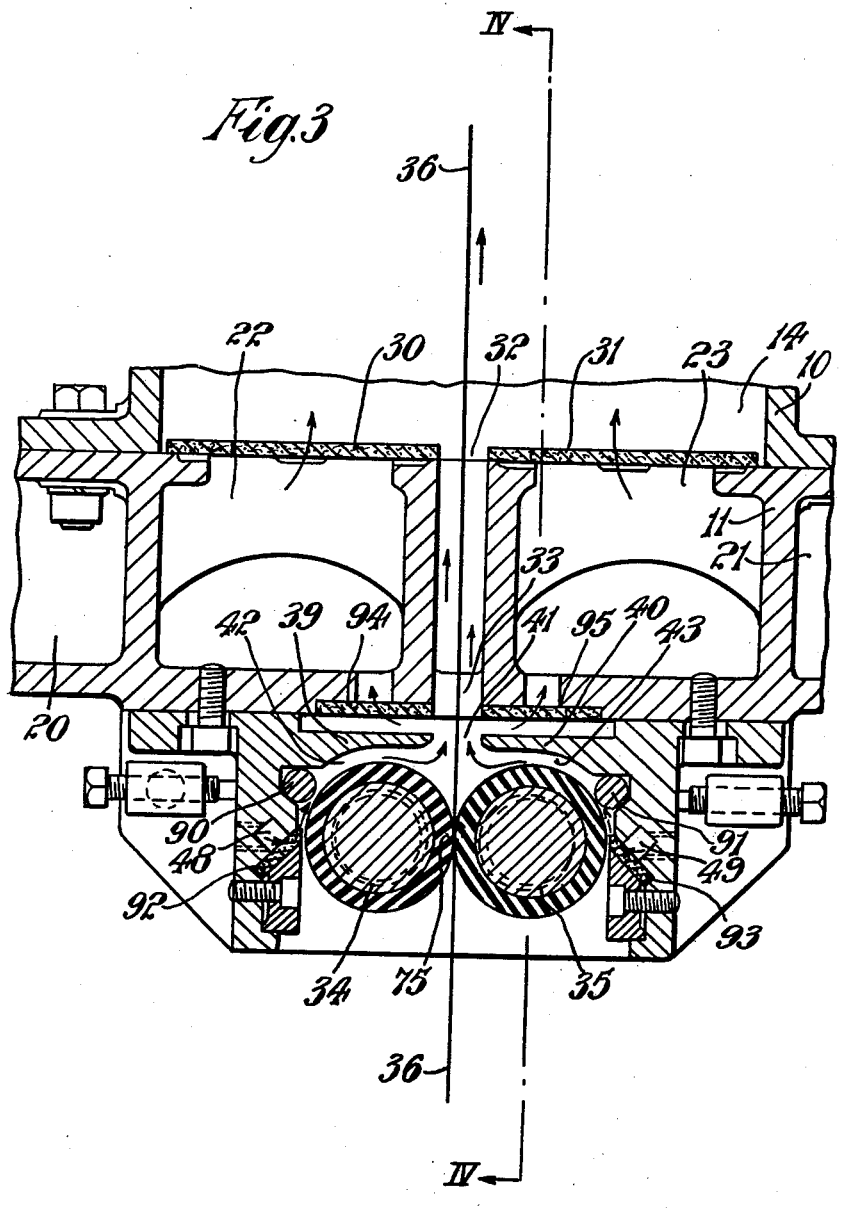

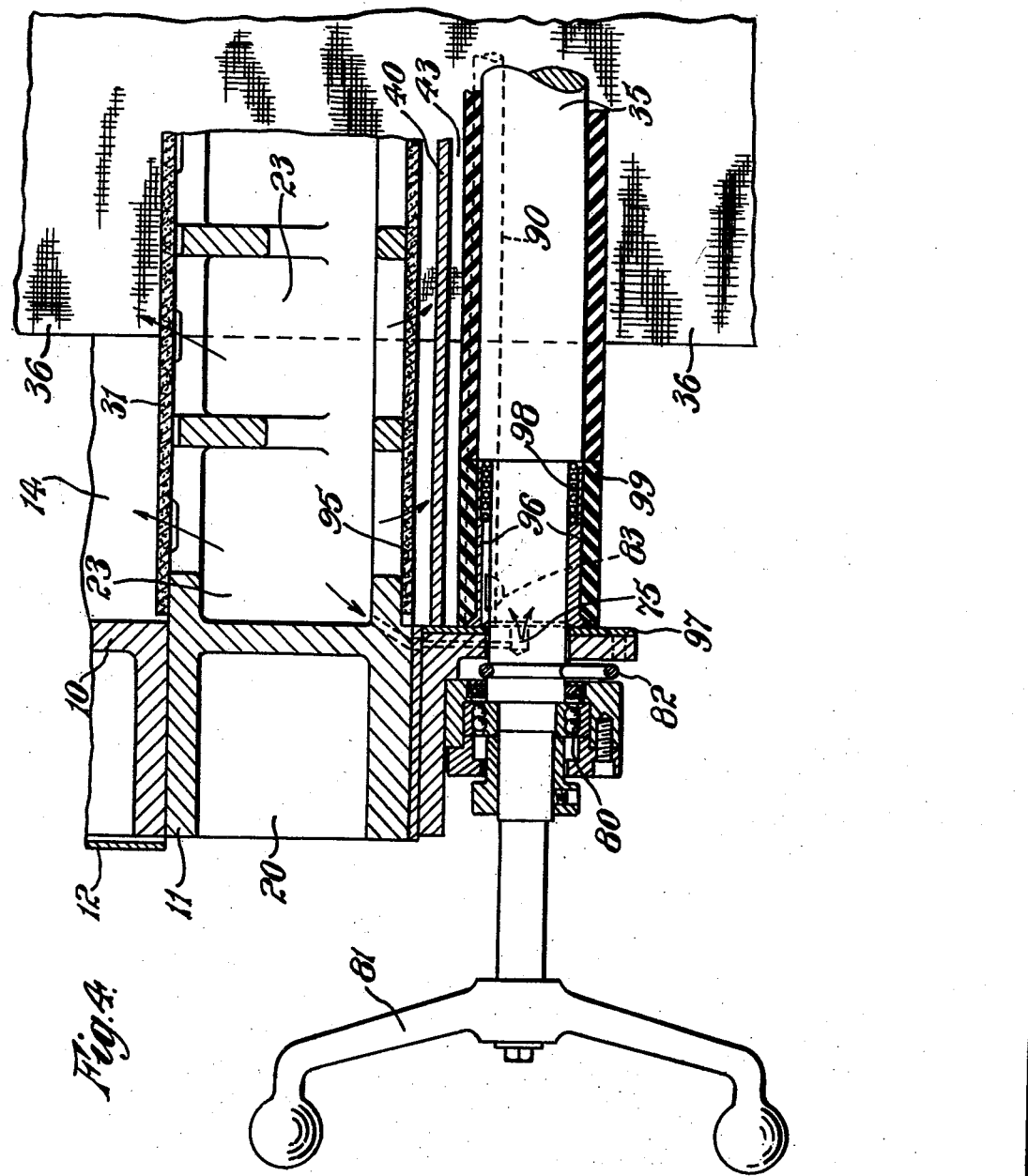

3,061,943
APPARATUS FOR THE HEAT TREATMENT OF SHEET MATERIALS
William Douglas Bennett, Sutton Coldfield, and Ronald Stansfield Goy, Castle Bromwich, near Birmingham, England, assignors, by mesne assignments, to Dunlop Tire and Rubber Corporation, Buffalo, N.Y., a corporation of New York
Filed Feb. 2, 1959, Ser. No. 790,676
Claims priority, application Great Britain Feb. 7, 1958
11 Claims. (Cl. 34—95)

This invention relates to apparatus for the heat treatment of sheet materials and more particularly to a closure for the base of a fluidised bed container.

In the heat treatment of sheet materials, such as textiles and thermoplastic materials, a method of heating or cooling these materials which has been found to be particularly advantageous consists in passing them through a fluidised bed of small solid particles, such as sand or glassbeads, heated or cooled to the desired temperature. The chief advantages of such a method lie in the high degree of heat transfer which can be obtained from the bed to the thermoplastic material or vice versa and in the accuracy of the control of the temperature of the materials which can be obtained.

The material to be heated is often passed through the bed by being led substantially vertically downwards into the bed and vertically upwards out of the bed, guide means such as a roller being provided for changing the direction of the material. However, in view of the fact that the roller is situated within the bed there is a risk that the roller will interfere with the proper fluidisation of the bed situated above the roller. Also, there is a risk that the bearings may be damaged or clogged by particles of the bed, especially when working at high temperatures.

The use of such a roller can be avoided by arranging for the material under treatment to enter the fluidised bed through a suitable opening in the base of the container therefor, thus making a single pass through the bed, but it is then necessary to prevent the particles of the bed from leaking out of the base of the apparatus through the opening.

It is an object of this invention to provide a closure for such apparatus that will permit the sheet material under treatment to enter the fluidised bed freely but prevent the particles of material constituting the bed from passing out of the apparatus.

According to the present invention a closure for the base of a fluidised bed container comprises a pair of rollers in peripheral contact adapted to permit the passage of sheet material therebetween, a casing extending longitudinally of the rollers and conforming to part of the peripheral portions thereof adjacent the fluid bed container, and means to prevent the egress of particles of the bed through the clearance between the casing and the peripheral portions of each of the rollers adjacent thereto.

One means of preventing egress of particles from the bed comprises means for applying compressed air or other gas to said clearances formed between said casing and said rollers.

An additional means for preventing egress of particles of the bed which may be provided comprises a sealing member extending substantially across the space between the casing and the said peripheral portion of the roller and arranged to make contact with said casing. The sealing member can be, for example, a static roller or a rod in one length, or divided to allow for heat expansion, arranged so that under the action of compressed air or other gas it makes sealing contact with the casing and is held a short distance away from the periphery of the main roller. Other sealing members can however, be used instead.

It is preferred that the main rollers should be in resilient contact in order that they can allow the sheet material to pass between them and also to grip the material, thereby preventing egress of particles of the bed. For this purpose the rollers may be conveniently coated with a layer of a resilient material such as rubber or they may be yieldably mounted. Usually the rollers will be caused to rotate freely by the passage of the sheet material between them, but, if desired, either or both of the rollers can be driven.

Preferably, the closure is joined to the fluidised bed container by a neck or channel extending from an orifice in the casing to an orifice in the base of the container and means is provided for supplying fluidising air or other gas to the particles in the channel in order to permit the unobstructed passage of the sheet material.

The invention will be fully understood from the following description of two embodiments thereof, which will be given with reference to the accompanying drawings wherein:

FIGURE 1 is a perspective view of a vertical section through the lower portion of one form of fluidised bed apparatus for heat treatment of textile sheet materials, FIGURE 2 is a fragmentary view showing details of the scavenging air flow, in the apparatus of FIGURE 1, FIGURE 3 is a vertical section of a portion of an alternative form of apparatus for the heat treatment of textile sheet material in which like reference numerals are used to describe parts corresponding to those in FIGURE 1, FIGURE 4 is a vertical section of the apparatus of FIGURE 3, taken on the line IV—IV.

Referring to FIGURE 1, the apparatus comprises a container 10 of rectangular cross-section and a base member 11, which forms the floor of the container 10, suspended therefrom. In the drawing there is shown only about one tenth of the height of the container 10 the sides of which are buttressed castings. The buttresses are enclosed by means of plates 12 forming a jacket to the inner container 10. The jacket is filled with a suitable heat insulator 13, such as glass wool.

The central space 14 of the container 10 is shown unoccupied for the sake of clarity but this space normally has therein a bed of finely divided solid particles forming a fluid bed. Situated within the container 10 and suitably spaced in the central space 14 are electrical elements 15 for heating the bed whereby the temperature can be thermostatically controlled to any temperature within the range of 100° to 250° C.

The base member 11 is suspended from container 10 by a series of hanger brackets 16 and bolts 17 which pass through packing pieces 18, the bolts being tightened to give a sliding fit to allow for heat expansion. The base 11 contains a number of galleries 20, 21, 22, 23, 24, 25 including a continuous ring-main 20, 21 forming the outer part of all four sides of the base member 11. On one outer wall of the base member 11 is the air supply tube 26. Two apertures, 27 and 28, are shown out of a number which connect the ring-main 20, 21 and the fluidising galleries 22, 23. The fluidising galleries 22, 23 are each covered with a porous plate 30, 31 of sintered stainless steel and these plates form the floor of the container 10. The two porous plates 30 and 31 are spaced apart by a short distance to form an orifice 32 with parallel sides. The inner longitudinal walls of the fluidising galleries 22 and 23 form a neck or channel 33, tapered at the base and situated directly below the orifice 32. The channel 33 is directly above the nip of a pair of rubber-coated main rollers 34, 35 mounted in peripheral contact and arranged to rotate freely during the passage of a sheet material 36 between them. The width of the channel 33 is relatively small at its base compared with the diameter of the rollers 34, 35. Inside and along the length of the main rollers 34 and 35 are pipes 37 and 38 for supplying cooling water to the interior of the rollers. The water inlet is at the further end of the rollers and is not shown. Rollers 34, 35 are mounted near to the portions of the casing 39, 40 which conforms to their shape. The clearances 42, 43 between the rollers 34, 35 and the casing 39, 40 can be closed at their lower ends by means of plates 44, 45 which are adjustable by sliding in guides. The inner ends of the plates 44, 45 are shaped to the main rollers 34, 35. Pipes 46, 47 for high pressure air lead into the chambers 48, 49 and thence the air can pass through sintered stainless steel plates 50, 51 to the clearances 42, 43 and generally into chamber 41, between the rollers and the casing. The air can pass through sintered stainless steel plates 52, 53 into the breather galleries 24, 25. The speed of the passage of the air into the breather galleries 24, 25 is varied by control 55 (the control on the other side of the machine is not shown) by which means sliding doors 56, 57 can be made to cover as much of the plates 52, 53 as is desired.

High pressure air pipe 69 enters end plate 70 which is urged against the ends of rollers 34 and 35 by means of springs 72 which abut against block 71. For the sake of increased clarity only part of the block 71 is shown and part of the end plate 70 is cut away to show journal 73.

A more detailed drawing of the end plate 70 showing the "scavenging" air pipe 69, is given in FIGURE 2 which shows the pipe 69 divided at point 74 whence a central pipe leads the air out of the plate 70 to a point 75 at the end of the main rollers 34, 35, near the nip of the rollers. Other pipes 76, 77 run from the point 74 and emerge from plate 70 at points 78 and 79 near to the outer edges of the ends of the rollers 34, 35. Supporting the main rollers 34, 35 and forming part of the base structure 11 are the bearings, part only of one bearing 80 being shown.

The main roller 34 is provided with a detachable handle 81, for manual operation. The apparatus also comprises gripping rollers and stretching rollers, not shown, which are mounted externally of the container and are respectively arranged to pass the sheet material through the fluidised bed and the closure and to stretch the sheet to a predetermined extent during its passage through the bed.

Referring to FIGURES 3 and 4, sealing rods 90, 91 form an additional means of closing the clearances 42 and 43 between the main rollers 34, 35 and the casing 39, 40. The sealing rods 90, 91 are especially useful when the particles forming the bed in the central space 14 are very small. Each sealing rod 90, 91 is arranged to make contact with both the casing 39, 40 and the main rollers 34, 35 to prevent particle leakage when the apparatus is not in use. Below the sealing rods 90, 91 are composite plates 92, 93 each plate consisting of a thin tile composed of polytetrafluorethylene available commercially under the trademark "Teflon," covered by a porous stainless steel plate. Plates 92, 93 are arranged with the porous side uppermost and forming one side of chamber 48 which is connected to the high-pressure air supply. The lower "Teflon" portions of the plates 92, 93 are almost in contact with main rollers 34, 35.

The end portion of each of the main rollers 34, 35 consists of a metal sleeve 96 having a rubber covering 99 of the same outer cross-sectional dimensions as the main roller. The outer end of the sleeve 96 is pressed against a "Teflon" end plate 97 by means of a spring 98. The rubber covering 99 of the sleeve 96 projects a little beyond the inner end of the sleeve 96 to allow for roller expansion when the bed is heated. The sleeve is in sliding attachment to the shaft of the roller by means of a Woodruff key 83. The handle 81 is, in this apparatus, fixed to the shaft of the main roller 35.

As an additional means of protection of the bearings of the apparatus barrier rings 82 of greater diameter than the shaft are introduced between the rollers and the bearings. These protective rings prevent particles reaching the bearings if, for example, a temporary stoppage in the air supply occurs.

The fluidising galleries 22, 23 have no breather galleries (as in FIGURE 1) but have sintered stainless steel plates 94, 95 as part of the floor of the galleries. As a further addition wear collars (not shown) can be fitted to each end of both main rollers.

In operation of the apparatus of FIGURE 1 central space 10 has therein a bed of smooth sand or ballotini having a uniform diameter which may be between 200 and 500 microns. Air or other gas is supplied through tube 26 to ring-main galleries 20 and 21 and thence through apertures 27, 28 to fluidising galleries 22, 23 at a maximum pressure of 30 lbs. per sq. in., though the pressure may be as low as 1 or 2 lbs. per sq. in. This air passes through porous plates 30, 31 which form the floor of the container 10 into the bed in space 14, thereby fluidising the finely divided material thereof. The arrows show the path of the air.

Plates 44, 45 are adjusted to be as near as possible to main rollers 34, 35 without being in actual contact therewith.

Air at a pressure of up to 80 lbs. per sq. in. is supplied to pipes 46, 47 and 69. From pipes 46 and 47 the air passes through chambers 48, 49 and sintered stainless steel plates 50, 51 into the clearances 42, 43 which are thereby kept free from particles. The air passes from the clearances 42, 43 to chamber 41 where it is joined by the air from pipe 69 and whence it proceeds to fluidise the particles in channel 33.

From pipe 69 air passes to points 75, 78 and 79 thus preventing any particles of the bed from reaching the ends of main rollers 34, 35 and the air then proceeds towards chamber 41. Some of the air from chamber 41 passes through sintered stainless steel plates 52, 53 into breather galleries 24, 25, the amount of air being controlled by sliding doors 56, 57 moved by means of control 55 and the corresponding control on the other side of the machine. By means of the breather galleries 24, 25 and the sliding doors 56, 57 the amount of air proceeding directly from chamber 41 to channel 33 is controlled. The air from the breather galleries can be taken to the ring-main galleries 20, 21 or outside the apparatus by provision of suitable pipes.

Heating elements 15 are switched on and the bed brought to the desired temperature. Water is passed through pipes 37, 38 to cool main rollers 34, 35.

The sheet material is introduced to the apparatus by lowering a heat-resistant leader strip made of asbestos or glass fibre and having a metal end, downwards through the bed in the space 14 and through orifice 32, channel 33, and chamber 41. The strip is then back-threaded between the main rollers 34, 35 by engaging handle 81 and rotating the roller 34 manually. The metal end after passing through the rollers 34, 35 is passed round the feeding and stretching rollers and attached to the end of the sheet material on a take-off reel, while the other end of the leader strip is passed round the upper feeding and stretching rollers and attached to a take-up reel. The apparatus is then run in the forward direction with the stretching rollers arranged to run at equal speeds so that no stretching force is applied. The leader strip and attached sheet material are thereby passed between the feed rollers, and through the main rollers 34, 35 in the closure, which operation causes the main rollers to be rotated in opposite directions thereby preventing particles from passing out of the apparatus. The sheet material then passes up through the channel 33 and the fluidised bed in the space 14 and between the upper stretching rollers. The stretching rollers are then geared to apply a stretching force to the sheet material as it passes through the fluidised bed where it is rapidly heated to the desired temperature. On leaving the stretching rollers, the sheet material is maintained in the stretched condition until it is cooled and set and it is then collected on a take-up reel. The stretching differential may be up to 15%. Provision is made for the changing of the take-up and take-off reels without affecting the continuous passage of sheet material through the apparatus.

In operation of the apparatus of FIGURES 3 and 4 the composite plates 92, 93 are disposed at a distance not greater than 0.01 inch from main rollers 34, 35 and provision is made for adjusting this distance as required. High pressure air from chambers 48, 49 passes through the upper, porous, portion of plates 92, 93 and lifts the sealing rods 90 and 91. The sealing rods are adjustably mounted to permit movement thereof a short distance from the main rollers 34, 35 so that sealing contact is made with the casing 39, 40 of the closure. The high pressure air used to keep the main rollers 34, 35 free from particles of the bed also fluidises the particles in channel 33 but some of the air can escape through sintered stainless steel plates 94, 95 into the low pressure air fluidising galleries 22, 23.

Apparatus according to this invention can be built to treat any required width of sheet material, it being desirable to have the main rollers of a length at least two or three inches longer than the width of the sheet material to be treated. For a standard fabric width of 54 inches an apparatus 5 feet long, 1 foot wide and with a fluidised bed 6 feet high containing 5 feet depth of sand or ballotini is suitable.

The apparatus of this invention can be used for the heat-setting of various thermoplastic materials in sheet form, such as nylon, polyester resins and polyvinyl resins (including polyvinyl alcohols).

Having now described our invention, what we claim is:

1. Apparatus for the heat treatment of sheet material which comprises a container for a bed of small solid particles, fluidizing means for maintaining said particles in a fluidized state in said container, said container comprising a base closing the lower part of said container and having a channel extending upwardly into said container for the passage of sheet material, a pair of rollers side-by-side and in peripheral contact below said channel for the passage of sheet material between said rollers and through said channel, a casing adjoining said base on opposite sides of said channel and extending from said base member about the upper regions of said rollers and having a clearance space about the adjacent surface of each roller opening into said channel, and means preventing the egress of particles from said container through said passage and into the clearances between said rollers and said casing.

2. The apparatus of claim 1 in which the lower end of said clearance is closed and in which said means preventing the egress of particles from said container through said passage into said clearances comprises means for supplying a gaseous medium under pressure above that in said container to said clearances above their closed lower ends.

3. The apparatus of claim 2 in which said means for fluidizing said particles in said container comprises means for supplying a gaseous medium under pressure above that in said container uniformly throughout the base of said container, said apparatus having individual means to control the supply of gaseous media to said fluidizing means and to said clearance.

4. The apparatus of claim 3 having a sealing rod in each clearance to close said clearance between said means for supplying said gaseous medium and said channel positioned to be moved from sealing position by the pressure of said gaseous medium and to fall to sealing position when the supply of said gaseous medium to said clearance is terminated.

5. The apparatus of claim 2 in which said rollers have resilient surfaces to permit the passage of a sheet therebetween.

6. The apparatus of claim 2 in which said channel is tapered at its lower part and flared above said narrowed part.

7. The apparatus of claim 2 in which said rollers have journals at their ends and said apparatus comprises bearings for said journals and said bearings have passages for a gaseous medium opening between said bearings and the ends of said rollers.

8. The apparatus of claim 2 in which each said roller has a journal at each end and said apparatus has a bearing for each said journal and in which each said roller has at each end a resilient sleeve abutting the end of said bearing and of the same outer diameter as the outer diameter of said roll and a supporting sleeve supporting said resilient sleeve slidably mounted on said roll and spring pressed against the end of its bearing.

9. The apparatus of claim 8 in which said bearing has an end plate of polytetrafluorethylene in abutment with said resilient sleeve.

10. The apparatus of claim 2 comprising means for supplying a cooling medium to the interior of each roll.

11. The apparatus of claim 2 in which said fluidizing means comprises a chamber in said base extending on each side of said channel and having a porous plate dividing said chamber from the interior of said container for the passage and distribution of gaseous medium to the interior of said container and said means for supplying a gaseous medium to said channel comprises a second chamber on each side of said channel having an outlet to said channel.

References Cited in the file of this patent

UNITED STATES PATENTS

| | | |
|---|---|---|
| 2,654,587 | Skivesen | Oct. 6, 1953 |
| 2,669,031 | Chase et al. | Feb. 16, 1954 |
| 2,785,478 | Audas et al. | Mar. 19, 1957 |
| 2,873,597 | Fahringer | Feb. 17, 1959 |
| 2,938,276 | Doleman et al. | May 31, 1960 |
| 2,971,242 | Doleman | Feb. 14, 1961 |